US010956024B2

(12) United States Patent
de Moraes et al.

(10) Patent No.: US 10,956,024 B2
(45) Date of Patent: Mar. 23, 2021

(54) MULTI-APPLICATION VIEWING

(71) Applicant: Hewlett-Packard Development Company, L.P., Houston, TX (US)

(72) Inventors: Juliano Godinho Varaschin de Moraes, Mountain View, CA (US); Nicholas Hallas, Palo Alto, CA (US); Carol Ozaki, Cupertino, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 241 days.

(21) Appl. No.: 15/318,577

(22) PCT Filed: Jun. 26, 2014

(86) PCT No.: PCT/US2014/044314
§ 371 (c)(1),
(2) Date: Dec. 13, 2016

(87) PCT Pub. No.: WO2015/199695
PCT Pub. Date: Dec. 30, 2015

(65) Prior Publication Data
US 2017/0131894 A1 May 11, 2017

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0485* (2013.01); *G06F 3/0488* (2013.01);
(Continued)

(58) Field of Classification Search
CPC ......... G06F 2203/04803; G06F 3/0485; G06F 16/435
See application file for complete search history.

(56) References Cited

U.S. PATENT DOCUMENTS 8,547,480 B1 * 10/2013 Brown ............... H04N 21/4307
348/500
2006/0287097 A1 * 12/2006 Moshal ................... G07F 17/32
463/42
(Continued)

FOREIGN PATENT DOCUMENTS

CN 102279694 A 12/2011
CN 103116437 A 5/2013
(Continued)

OTHER PUBLICATIONS

Gurman, M.; "Apple plans to match Microsoft Surface with split-screen iPad multitasking in iOS 8"; May 13, 2014; 31 pages, https://9to5mac.com/2014/05/13/apple-plans-to-match-microsoft-surface-with-split-screen-ipad-multitasking-in-ios-8/.
(Continued)

Primary Examiner — Di Xiao
(74) Attorney, Agent, or Firm — Michael A. Dryja

(57) ABSTRACT

In one example implementation, a computing device displays a first application window and second application window adjacent to each other in a multi-application viewing area. The computing device detects a gesture in either an upper gesture detection area or a lower gesture detection area and controls either the first application window or second application window based on the gesture.

20 Claims, 9 Drawing Sheets

(51) Int. Cl.
*G09G 5/14* (2006.01)
*G06F 3/0485* (2013.01)
*G09G 5/34* (2006.01)

(52) U.S. Cl.
CPC ..... *G09G 5/14* (2013.01); *G06F 2203/04803* (2013.01); *G09G 5/34* (2013.01); *G09G 2354/00* (2013.01)

(56) References Cited

U.S. PATENT DOCUMENTS

| | | |
|---|---|---|
| 2008/0001924 A1 | 1/2008 | Reyes et al. |
| 2008/0148149 A1 | 6/2008 | Singh et al. |
| 2010/0248788 A1 | 9/2010 | Yook et al. |
| 2013/0120254 A1 | 5/2013 | Mun et al. |
| 2013/0300684 A1 | 11/2013 | Kim et al. |
| 2014/0035853 A1 | 2/2014 | Ok et al. |
| 2014/0075394 A1 | 3/2014 | Nawle et al. |
| 2014/0096049 A1 | 4/2014 | Vonshak et al. |
| 2014/0096070 A1* | 4/2014 | Mishima ............ G06F 3/04886 715/784 |
| 2014/0164966 A1* | 6/2014 | Kim .................. G06F 3/04886 715/769 |
| 2014/0240506 A1* | 8/2014 | Glover ................. H04N 7/181 348/159 |
| 2014/0267103 A1* | 9/2014 | Chaudhri ............. G06F 3/0482 345/173 |
| 2015/0068819 A1* | 3/2015 | Dyer .................. G01G 23/3721 177/1 |
| 2015/0237290 A1* | 8/2015 | Lee .................... H04N 5/44591 348/570 |

FOREIGN PATENT DOCUMENTS

| | | |
|---|---|---|
| KR | 10-2012-0010056 | 2/2012 |
| KR | 10-2013-0054071 | 5/2013 |

OTHER PUBLICATIONS

King, B.; "Rockchip Electronics Unveils Multi-window Android Multitasking That Could Actually be Useful"; http://www.androidpolice.com/2013/07/23/rockchip-electronics-unveils-multi-window-android-multitasking-that-could-actually-be-useful/; Jul. 23, 2013; 12 pages.

Peters, J., Best Floating Apps for Serious Multitasking on Android, http://www.talkandroid.com/guides/beginner/best-floating-apps-for-serious-multitasking-on-android-august-2013/, Aug. 9, 2012.

Rice, J., AT&T Re-gifts Multi-window Support, Gives it to Samsung Galaxy Note II Owners, http://www.androidpolice.com/2012/12/27/att-re-gifts-multi-window-support-gives it to samsung-galaxy-note-ii-owners/, Retrieved from the Internet on Dec. 9, 2016.

Whitwam, R.; "Ixonos Shows Off a New Version of Its Awesome Android Multi-window Tech, Still Won"; http://www.androidpolice.com/2013/09/24/ixonos-shows-off-a-new-version-of-its-awesome-android-multi-window-tech-still-wont-say-who-its-being-developed-for/; Sep. 23, 2013; pp. 11.

* cited by examiner

MULTI-APPLICATION VIEWING

CROSS-REFERENCE TO RELATED APPLICATION

This application is a U.S. National Stage Application of and claims priority to International Patent Application No. PCT/US2014/044314, filed on Jun. 26, 2014, and entitled "MULTI-APPLICATION VIEWING," which is hereby incorporated by reference in its entirety.

BACKGROUND

A graphical user interface (GUI) is an interface type that allows a user to interact and control a computing device like a tablet, smartphone, desktop, or notebook. The GUI was introduced to provide a more user-friendly experience when compared to a command-line interface (CLI). When the GUI was first introduced, it was primarily controlled via keyboard, mouse, or joystick input. Recently, however, many GUIs are controlled via touch in addition to or as an alternative to keyboard, mouse, and joystick input.

BRIEF DESCRIPTION OF THE DRAWINGS

Examples are described in the following detailed description and in reference to the drawings, in which.

NOTATION AND NOMENCLATURE

Figure 1:
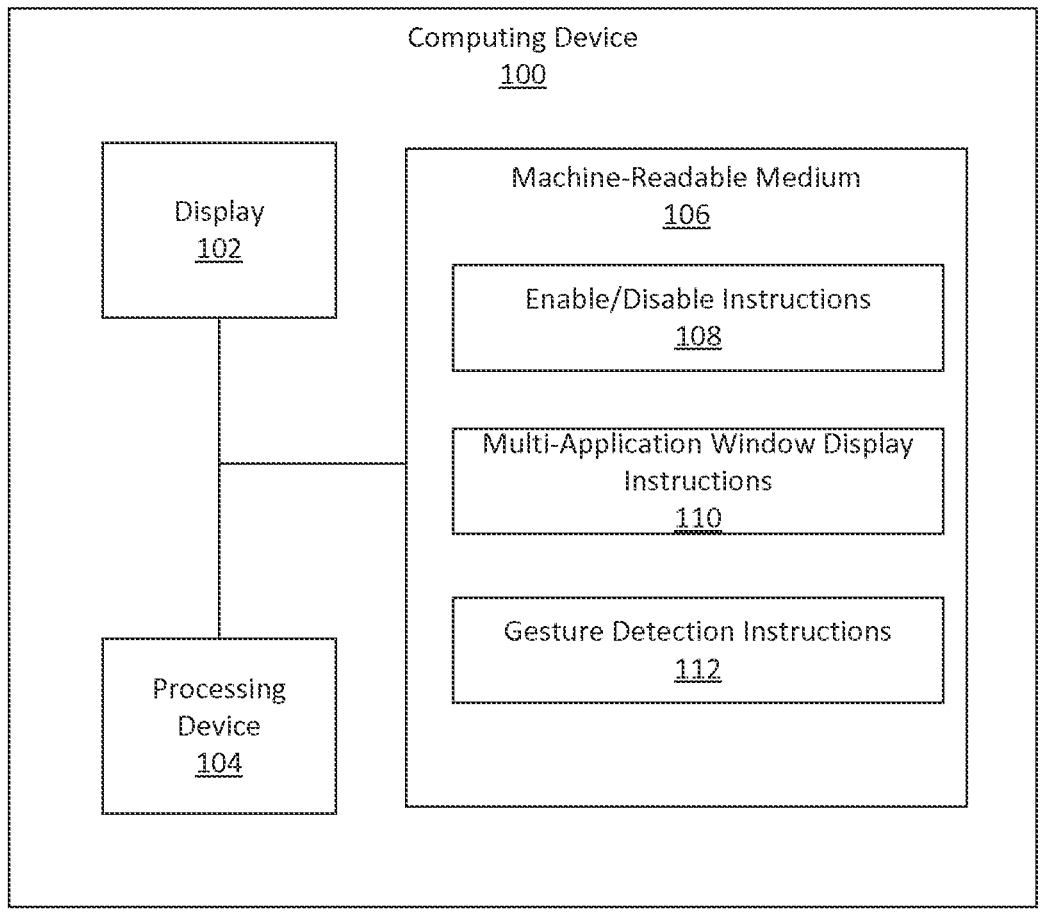
FIG. 1 depicts an example computing device in accordance with an example implementation of the present disclosure.

Certain terms are used throughout the following description and claims to refer to particular system components. As one skilled in the art will appreciate, technology companies may refer to components by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct electrical or mechanical connection, through an indirect electrical or mechanical connection via other devices and connections, through an optical electrical connection, or through a wireless electrical connection. Additionally, the term "application" or "app" is intended to refer to machine-readable instructions that cause a device to perform a specific task when executed, Example applications or "apps" include navigation applications (e.g., the Google® Maps app), video sharing applications (e.g., the YouTube® app), sports news applications (e.g., the ESPN® app), and the like. Furthermore, the term "application window" is intended to refer to the portion of the GUI that frames or borders the application content. For example, for the YouTube® app, the application window would be the rectangular border or frame that surrounds the content provided by YouTube®. Finally, the term "constant aspect ratio" is intended to mean that the user cannot resize or modify the aspect ratio of the application window, where the aspect ratio specifies the relationship between the width (x-axis) and the height (y-axis) of the application window.

DETAILED DESCRIPTION

As mentioned above, GUIs have recently advanced such that they are controlled via touch and other advanced input forms like eye-tracking input and speech input. Moreover, GUIs have advanced with the introduction of mobile operating systems like Android and iOS. These mobile operating systems tend to run on smartphones and tablets, but have also recently extended to notebooks and all-in-one (AiO) desktops.

Among other things, the mobile operating systems run applications or "apps," which are generally software applications focused on a specific task. For example, a mobile computing device may have one app to specifically provide weather information, another app to specifically provide financial information, another app to specifically provide driving directions, and so forth.

One common problem with current mobile operating systems, however, is that the user interface is limited with respect to displaying multiple applications at once. In particular, in most cases, only one app is viewable at a time.

More specifically, upon initialization, the one application usually enlarges to encompass the entire display. For many use cases, this is adequate. But in some use cases where the computing device comprises a larger screen, the user may want to view multiple apps at once. For example, the user may want to view a financial application and spreadsheet application at the same time on a single screen.

While there are some multi-application viewing approaches available to users, these approaches typically are not user friendly. For example, some approaches try to utilize a traditional desktop user interface approach, where multiple applications windows may be opened, resized, and controlled via toolbars. This approach is not user friendly at least because the toolbar controls are quite difficult to navigate with touch input. Moreover, because the application window may be resized, many applications are not supported and/or available for multi-application viewing. Still further, when numerous applications are opened, the navigation between the various application windows is cumbersome due to overlapping and difficulty distinguishing between when the user is attempting to control the application window or interact with the application itself.

Aspects of the present disclosure may address at least the above-mentioned issues by providing a user interface approach that enables intuitive and user-friendly control and viewing of multiple applications. More particularly, aspects of the present disclosure provide a user-friendly approach to view and control at least two applications windows that are running and displayed at the same time. When a user has more than two applications initialized, the approach enables a user to navigate between the various applications in an intuitive manner through various gestures in predefined areas that do not overlap with the application windows. These and other approaches are discussed in greater detail below with reference to various figures and example implementations.

In one example implementation, a computing device is provided. The computing device comprises a display, a processing device, and a non-transitory machine-readable medium. The machine-readable medium includes instructions that when executed by the processing device cause the computing device to (i) receive a command to enable a multi-application viewing mode; (ii) display a first application window and second application window adjacent to each other in a multi-application viewing area on the display, wherein the first application window and second application window are to maintain a constant aspect ratio of 4:3, 16:9, 16:10, 21:9, or 17:9 while multiple application windows are displayed in the multi-application viewing area, and wherein the first application window is to display a first application and the second application window is to display a second application; (iii) detect a first swipe gesture in a first direction in either an upper gesture detection area or a lower gesture detection area, wherein the upper gesture detection area is located above the multi-application viewing area and does not overlap the multi-application viewing area, and wherein the lower gesture detection area is located below the multi-application viewing area and does not overlap the multi-application viewing area; and (iv) display, in response to the first swipe gesture, the second application window and a third application window adjacent to each other in the multi-application viewing area, and discontinue display of the first application window, wherein the third application window displays a third application which was initialized prior to the first swipe gesture.

In another example implementation, a method is provided. The method comprises (i) receiving, at a computing device, a command to initialize a first application, a second application, a third application, and a fourth application; (ii) receiving, at the computing device, a command to enter a multi-application viewing mode; (iii) displaying a first application window which displays the first application in an upper left portion of a multi-application viewing area; (iv) displaying a second application window which displays the second application in an upper right portion of the multi-application viewing area; (v) displaying a third application window which displays the third application in a lower left portion of the multi-application viewing area; (vi) displaying a fourth application window which displays the fourth application in a lower right portion of the multi-application viewing area; (vii) detecting a first gesture in an upper gesture detection area and controlling either the first application window or the second application window based on the first gesture, wherein the upper gesture detection area is located above the multi-application viewing area and does not overlap the multi-application viewing area; and (viii) detecting at least one second gesture in a lower gesture detection area and controlling either the third application window or the fourth application window based on the at least one second gesture, wherein the lower gesture detection area is located below the multi-application viewing area and does not overlap the multi-application viewing area, and wherein the first application window, second application window, third application window, and fourth application window have a constant aspect ratio of 4:3, 16:9, 16:10, 21:9, or 17:9 while multiple application windows are displayed in the multi-application viewing area.

In yet another example implementation, a non-transitory machine-readable medium is provided. The machine-readable medium includes instructions that when executed cause a computing device to (i) display a first application window and second application window adjacent to each other in a multi-application viewing area, wherein the first application window is to maintain a first constant aspect ratio and second application window is to maintain a second constant aspect ratio while multiple application windows are displayed in the multi-application viewing area; and (ii) detect a gesture in either an upper gesture detection area or a lower gesture detection area and control either the first application window or second application window based on the gesture, wherein the upper gesture detection area is located above the multi-application viewing area and does not overlap the multi-application viewing area, and wherein the lower gesture detection area is located below the multi-application viewing area and does not overlap the multi-application viewing area, wherein the first application window displays a first application and the second application window displays a second application, wherein both the first and second applications are periodically or continuously refreshed while being displayed in the multi-application viewing area, and wherein a detected touch in the first application window controls the first application and a detected touch in the second application window controls the second application.

Turning now to FIG. 1, this figure depicts an example computing device 100 in accordance with an implementation. The computing device 100 comprises a display 102, a processing device 104, and a machine-readable medium 106. It should be readily apparent that the computing device 100 is a generalized illustration and that other elements may be added or existing elements may be removed, modified, or rearranged without departing from the scope of the present disclosure.

The computing device 100 comprises, for example, a smartphone, tablet, notebook, hybrid/convertible notebook, AiO desktop, smart display/television, workstation, gaming device, or other similar computing device. The display 102 comprises, for example, a liquid crystal display (LCD), plasma display, light emitting diode (LED) display, organic LED (OLED) display, thin film transistor display (TFTLCD), super LCD, active matrix OLED (AMOLED), retina display, cathode ray tube (CRT), electroluminescent display (ELD), or another type of display capable of presenting a GUI. In various implementations, the display 102 is associated with a touch screen to detect input from a user's finger or stylus. For example, the touch screen may detect touch events using one of the following example touch technologies: a resistive touch panel, a capacitive touch panel, a surface acoustic wave touch panel, an infrared touch panel, an optical imaging touch panel, or a dispersive signal sensing touch panel.

The processing device 104 may be at least one of a microprocessor, central processing unit (CPU), microcontroller, graphic processing unit (GPU), semiconductor-based microprocessor, and/or another processing device to retrieve and execute instructions. The instructions are stored on the non-transitory machine-readable medium 106. The machine-readable medium 106 may correspond to any typical storage device that stores instructions, such as programming code or the like. For example, the machine-readable medium 106 may include one or more of a non-volatile memory, a volatile memory, and/or a storage device. Examples of non-volatile memory include, but are not limited to, electronically erasable programmable read only memory (EEPROM), read only memory (ROM), flash memory, ferroelectric RAM (F-RAM), magnetoresistive RAM (MRAM), and memristor based memory. Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some implementations, the instructions may be part of an installation package that may be executed by the processing device 104. In this case, the machine-readable medium 106 may be a portable medium such as a CD, DVD, or flash drive or a memory maintained by a server from which the installation package can be downloaded and installed. In another implementation, the instructions may be part of an application or application already installed. In some implementations, the processing device 104 and machine-readable medium 106 may be integrated into a single component, while in other implementations, the processing device 104 and machine-readable medium 106 may be discrete components within the computing device 100.

As shown in FIG. 1, the machine-readable medium 106 comprises various machine-readable instructions. These instructions, when executed by the processing device 104, cause the computing device 100 to perform various actions. For example, the enable/disable instructions 108, when executed, cause the computing device 100 to enable and/or disable a multi-application viewing mode based on user input. Moreover, these instructions 108 enable a user to select the amount of viewable applications windows to be shown within a multi-application viewing area. For example, the user may select an option to display two application windows side-by-side and adjacent to one another in the multi-application viewing area. Alternatively, the user may select an option to display four applications in a 2×2 matrix in the multi-application viewing area.

Turning now to the multi-application window display instructions 110, these instructions, when executed, cause the computing device 100 to display and enable manipulation of multiple applications windows within the multi-application viewing area. For example, the multi-application window display instructions 110 may cause the computing device 100 to display a first application window and second application window adjacent to each other in the multi-application viewing area on the display, and enable a user to view additional application windows in response to user gestures, Such gesture control is enabled via the gesture detection instructions 112. These gesture detection instructions 112, when executed, cause the computing device 100 to detect gestures commands and trigger actions based thereon. For example, the gesture detection instructions 112 may cause the computing device 100 to detect predefined gestures that occur within predefined upper and lower gesture detection areas.

Figure 2:
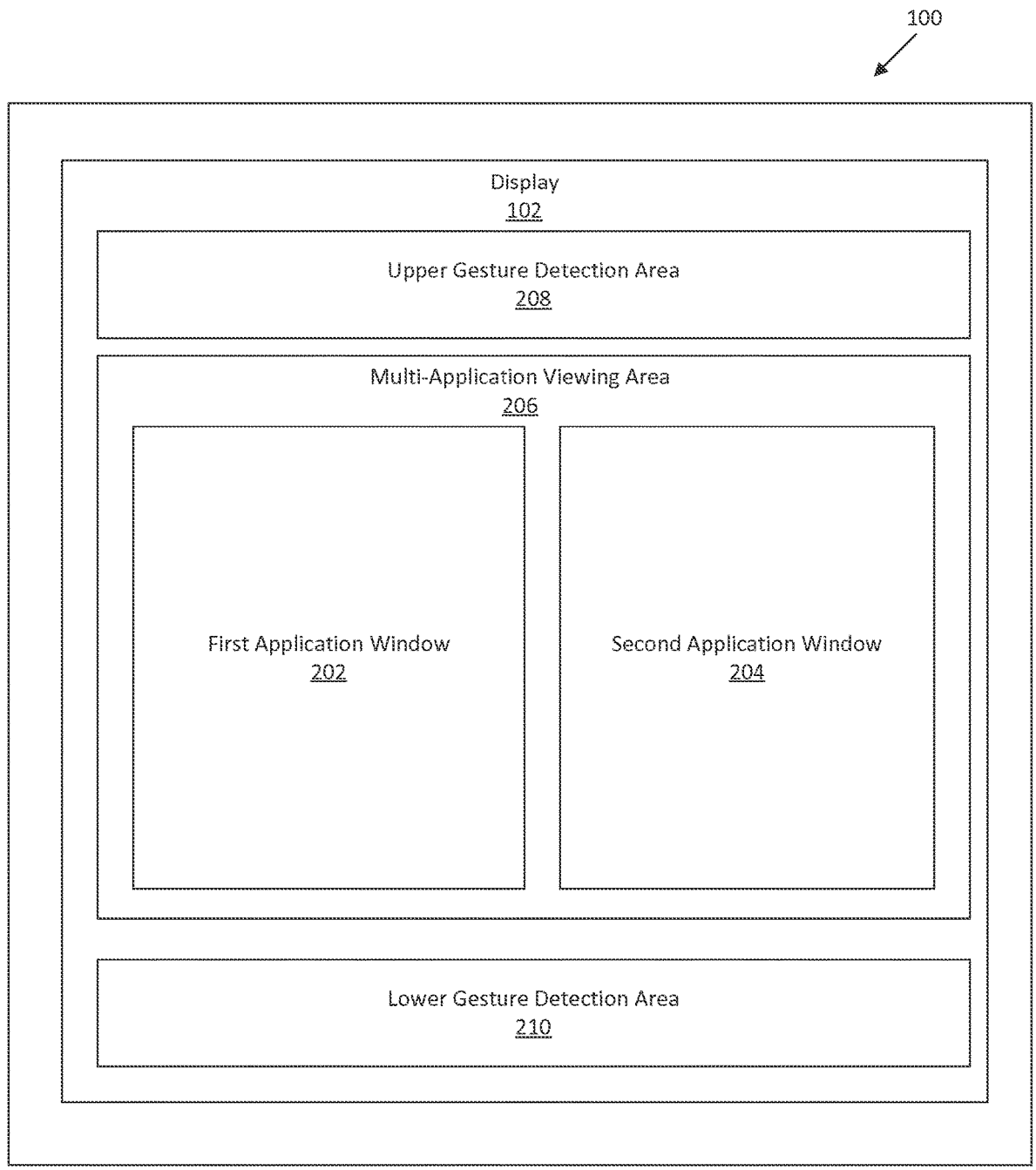
FIG. 2 depicts an example computing device with a display presenting a first application window and second application window within a multi-application viewing area in accordance with an example implementation of the present disclosure.

Looking now at FIG. 2, this figure depicts an example computing device 100 with a display 102 presenting a first application window 202 and second application window 204 within a multi-application viewing area 206 in accordance with an implementation. In addition, the figure depicts an upper gesture detection area 208 and a lower gesture detection area 210.

In one example, the user triggers multi-application viewing mode by selecting a multi-application viewing mode option presented on the display. The user then may select an option for 2×1 viewing where two application windows may be viewed side-by-side in the multi-application viewing area 206. The user may then initialize at least two applications. For example, the user may initialize a financial application (e.g., the Yahoo® Finance App) and a shopping application (e.g., the Amazon® App). The first application window 202 displays the first application (e.g., the Yahoo® Finance App) and the second application window 204 displays the second application (e.g., the Amazon® App). Each application displayed in the multi-application viewing area 206 is continuously or periodically refreshed (i.e., both applications are "active" or "running"). Thus, in this example, the user may shop in the second application window 204 while staying up-to-date with stock market activity via the first application window 202. In other examples, the user may watch a video in the first application window 202 (e.g., via the YouTube® App) while keeping up-to-date with the World Cup scores in the second application window 204 (e.g., via the ESPN® App).

In various implementations, the aspect ratio of the first application window 202 and second application window 204 is constant while multiple application windows are displayed in the multi-application viewing area 206. This means the user may not resize or modify the aspect ratio of the first application window 202 or the second application window 204 while multiple application windows are displayed in the multi-application viewing area 206. For example, in various implementations, the aspect ratio of the first application window 202 and the second application window 204 is predefined at 4:3, 16:9, 16:10, 21:9, or 17:9, and the user cannot resize the application window to another aspect ratio while multiple application windows are displayed in the multi-application viewing area. Among other things, this constant aspect ratio may enable the computing device 100 to support a wide variety of applications due to a consistent aspect ratio that is optimized and compatible for various applications. In the event that the user would like to maximize one application for enlarged viewing such that multiple applications are not displayed in the multi-application viewing area 206, the aspect ratio may change to the default aspect ratio for the computing device 100. For example, the aspect ratio may be 4:3 for the first application window 202 and the second application window while both windows are displayed in the multi-application viewing area 206. In response to the user requesting the first application window 202 be maximized (e.g., via a double tap gesture below the first application window 202 in the lower gesture detection area 210), the first application window would enlarge to encompass the full screen and the aspect ratio would change to the default aspect ratio for the computing device 100. In some implementations, the default aspect ratio would be the same (i.e., 4:3), while in other implementations the default aspect ratio would change (e.g., change from 4:3 to 16:9, 16:10, 21:9, or 17:9).

Above and below the multi-application viewing area 206 are gesture detection areas. In particular, an upper gesture detection area 208 is located above the multi-application viewing area 206 and does not overlap the multi-application viewing area 206. And the lower gesture detection area 210 is a located below the multi-application viewing area 206 and does not overlap the multi-application viewing area 206. Each of these gesture detection areas 208, 210 enable a user to control the first application window 202 and second application window 204 via gesture commands. In particular, the first application window 202 and second application window 204 do not include respective title bars to control (e.g., close/maximize) the window. Hence, in some examples, the user is to rely solely on gesture commands to control each application window 208, 210.

In one example implementation, a gesture command above or below an application window controls that application window. For instance, a detected double tap gesture below the first application window 202 in the lower gesture detection area 210 may cause the first application window to maximize. Similarly, a detected double tap gesture above the first application window 202 in the upper gesture detection area 218 may cause the first application window to maximize. Additionally, a detected swipe up gesture below the second application window 204 in the lower gesture detection area 210 may cause the second application window 204 to close. Similarly, a detected swipe down above the second application window 204 in the upper gesture detection area 218 may cause the second application window 204 to close. Furthermore, a detected tap and hold gesture below the first application window 202 in the lower gesture detection area 210 may enable the user to reposition the first application window 202. For example, the user may move the first application window 202 from the left position shown in FIG. 2 to the right position where the second application tap window 204 is shown by taping beneath the first application window 202 in the lower gesture detection area 210, holding the user's finger in place for predetermined amount of time (e.g., 2 seconds), and then sliding the user's finger over to the right.

Figure 3A:
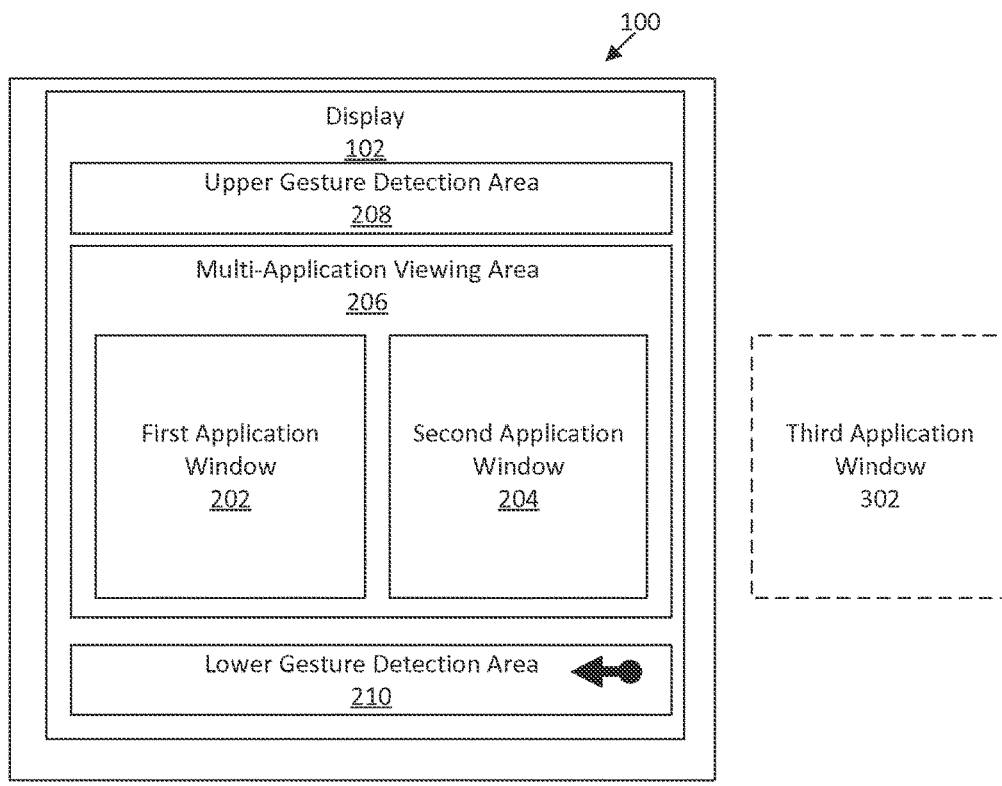
FIGS. 3(a) and 3(b) depict an example computing device with a display presenting a first application window and a second application window within a multi-application viewing area and enabling scrolling to view a third application window in accordance with an example implementation of the present disclosure.
Figure 3B:
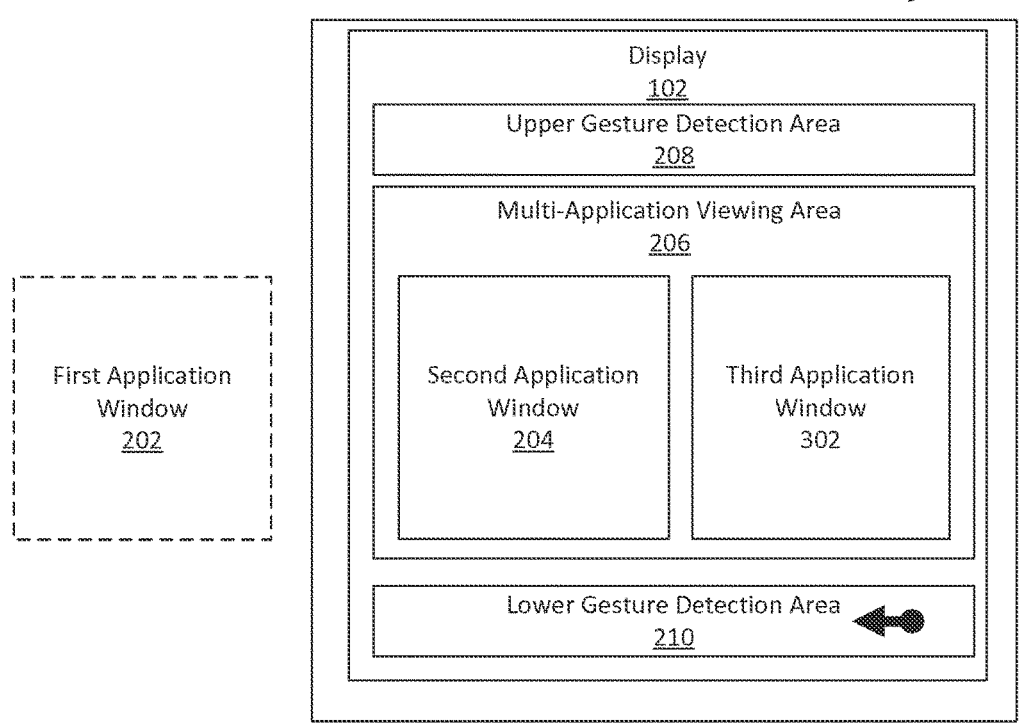

Turning now to FIGS. 3(*a*) and 3(*b*), these figures depict an example computing device 100 with a display 102 presenting a first application window 202 and second application window 204 within a multi-application viewing area 206 and enabling scrolling to view a third application window 302 in accordance with an example implementation. More particularly, aspects of the present disclosure enable a user to initialize more than two applications (three applications in the FIG. 3 example), and scroll through the applications via gesture commands. For instance and continuing with the previous example from FIG. 2, the user may open three applications (e.g., the Yahoo® Finance App, the Amazon® App, and the ESPN® App). While respectively viewing the Yahoo® Finance App and the Amazon® App in the first application window 202 and second application window 204 within the multi-application viewing area 206, the user may decide that she would like to view the ESPN® App and does not wish to close the Yahoo® Finance App. In this case, the user may conduct a left swipe gesture in either the lower gesture detection area 210 or the upper gesture detection area 208. In response to detecting this gesture, the computing device 100 may scroll the applications to the left such that the second application window 204 and third application window 302 are viewable within the multi-application viewing area 206, and the first application window 202 is no longer visible. In the event that the user would like to switch back to view first application window 202 and second application window 204, the user may conduct at least one right swipe gesture in either the lower gesture detection area 210 or the upper gesture detection area 208.

In order to reduce power consumption, in various examples, only the applications being displayed in the multi-application viewing area 206 are periodically or continuously refreshed. Thus, in FIG. 3(*a*) only the applications displayed in the first application window 202 and second application window 204 are periodically or continuously refreshed, while the application displayed in third application window 302 is not periodically or continuously refreshed (i.e., the third application is "paused"). By contrast, in FIG. 3(*b*), only the applications displayed in the second application window 204 and third application window 302 are periodically or continuously refreshed, while the application displayed in the first application window 202 is not periodically or continuously refreshed (i.e., the first application is "paused").

Figure 4A:
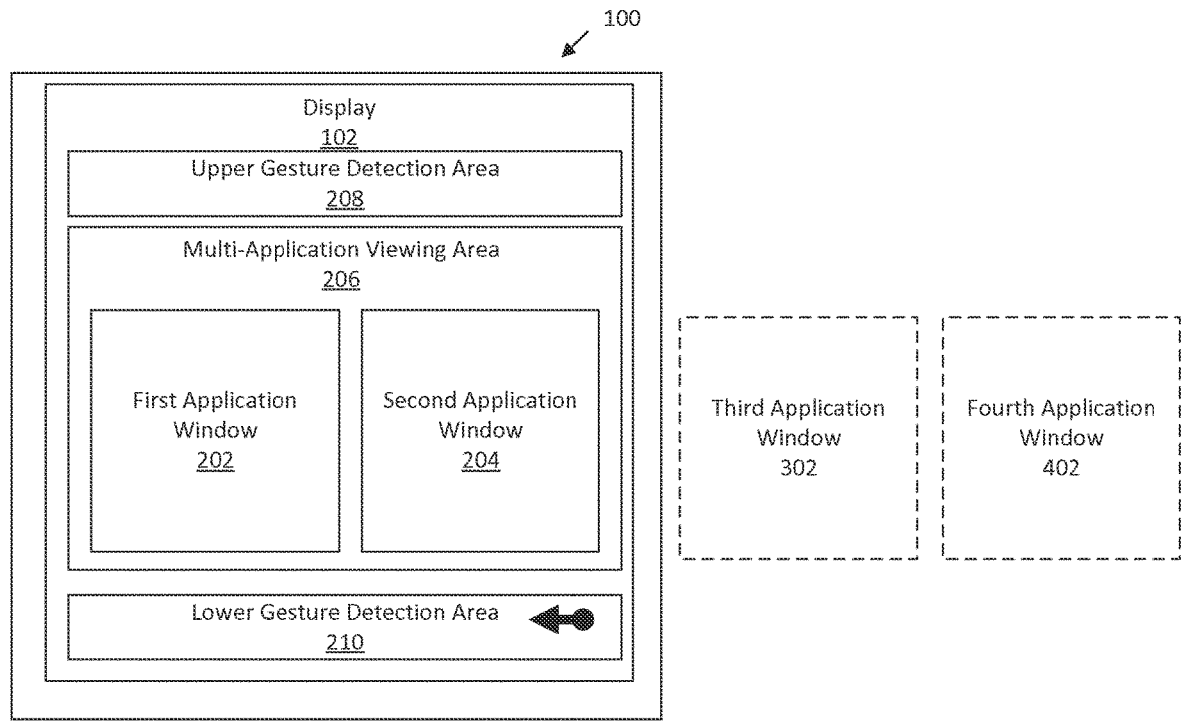
FIGS. 4(a) and 4(b) depict an example computing device with a display presenting a first application window and second application window within a multi-application viewing area and enabling scrolling to view a third application window and a fourth application window in accordance with an example implementation of the present disclosure.
Figure 4B:
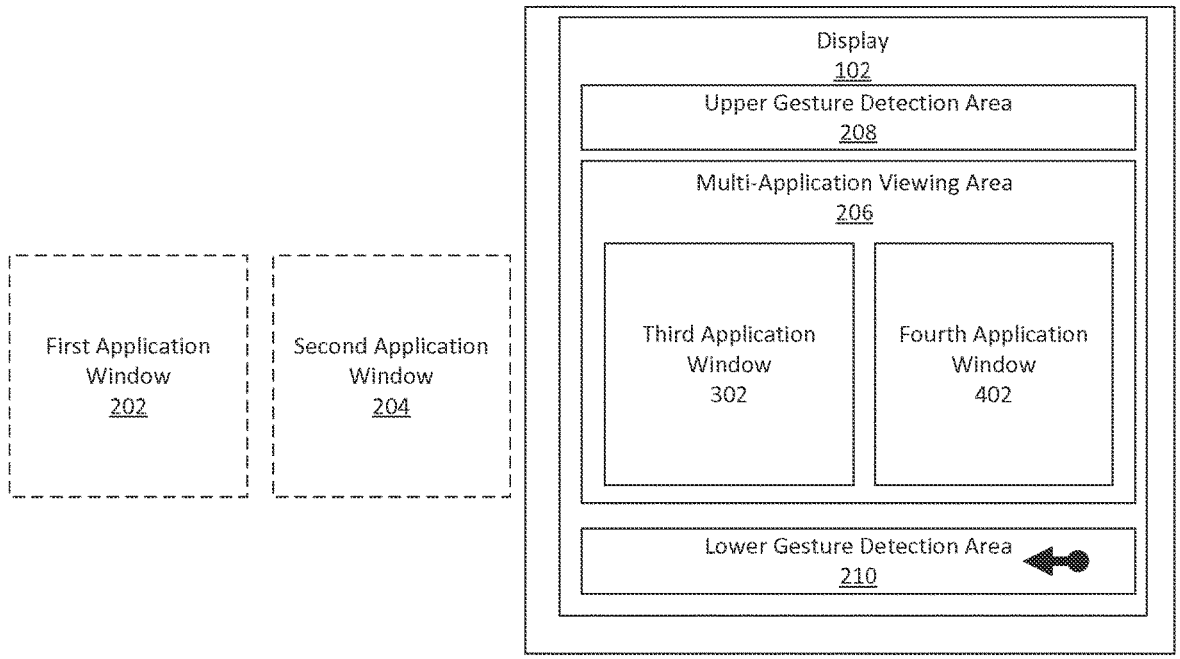

Looking now at FIGS. 4(*a*) and 4(*b*), these figures depict an example computing device 100 with a display 102 presenting a first application window 202 and second application window 204 within a multi-application viewing area 206 and enabling scrolling to view a third application window 302 and fourth application window 402 in accordance with an example implementation. More particularly, aspects of the present disclosure enable a user to initialize more than two applications (four applications in the FIG. 3 example), and scroll through the applications via gesture commands. For instance and continuing with the previous example from FIGS. 2 and 3, the user may open four applications (e.g., the Yahoo® Finance App, the Amazon® App, the ESPN® App, and the YouTube® app). While respectively viewing the Yahoo® Finance App and the Amazon® App in the first application window 202 and second application window 204 within the multi-application viewing area 206, the user may decide that she would like to view the ESPN® App and YouTube® app, and does not wish to close the Yahoo® Finance App and Amazon® App. In this case, the user may conduct a left swipe gesture in either the lower gesture detection area 210 or the upper gesture detection area 208. In response to detecting this gesture, the computing device 100 may scroll the applications to the left such that the second application window 204 and third application window 302 are viewable within the multi-application viewing area 206, and the first application window 202 is no longer visible. The user may then conduct another left swipe gesture in either the lower gesture detection area 210 or the upper gesture detection area 208. In response to detecting this gesture, the computing device 100 may scroll the applications further to the left such that the third application window 302 and fourth application window 402 are viewable within the multi-application viewing area 206, and the first application window 202 and second application window 204 are no longer visible. In the event that the user would like to switch back to view first application window 202 and second application window 204, the user may conduct two right swipe gestures in either the lower gesture detection area 210 or the upper gesture detection area 208.

Figure 5:
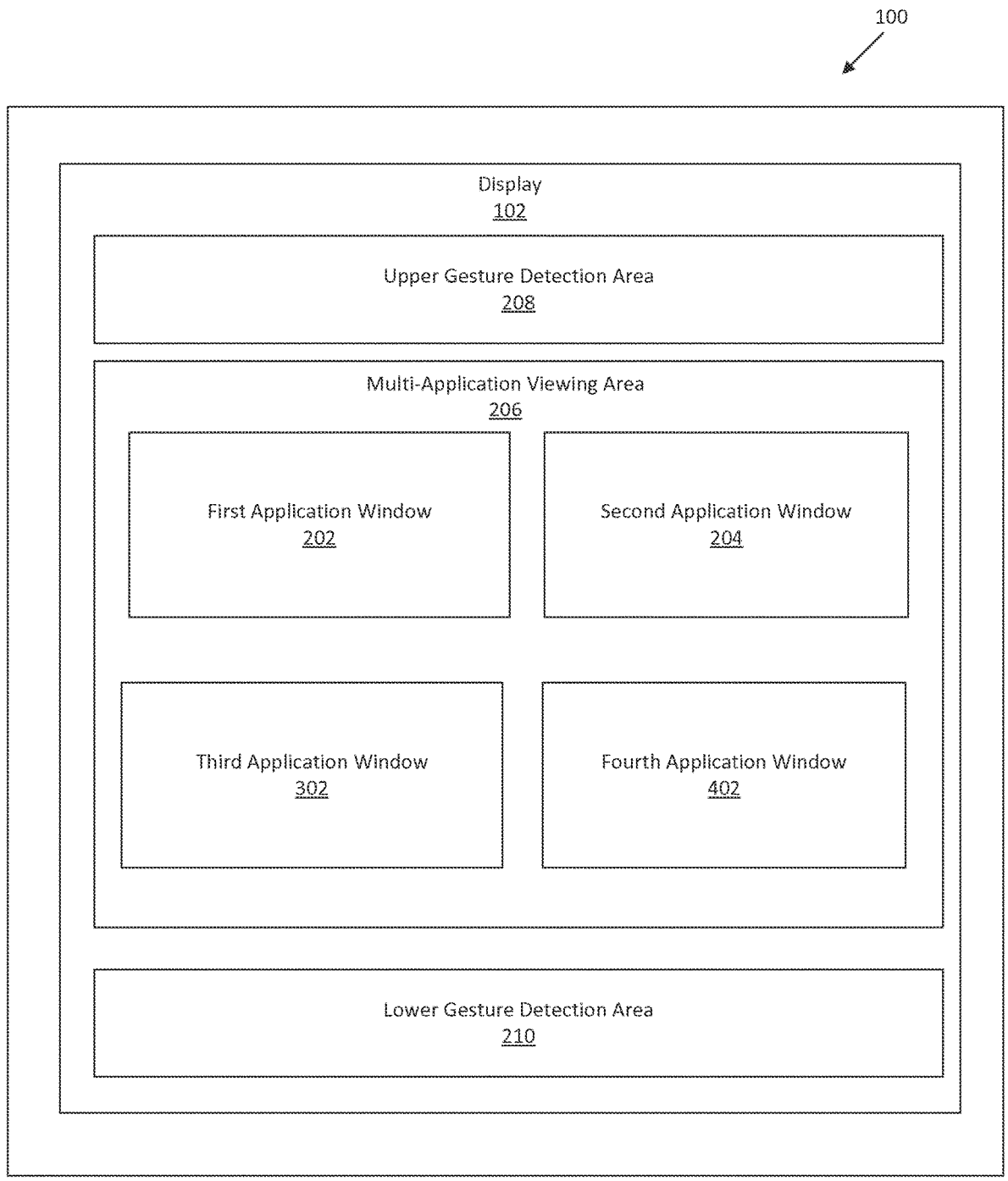
FIG. 5 depicts an example computing device with a display presenting a first application window, second application window, third application window, and fourth application window within a multi-application viewing area in accordance with an example implementation of the present disclosure.

Looking now at FIG. 5, this figure depicts an example computing device 100 with a display 102 presenting a first application window 202, second application window 204, third application window 302, and fourth application window 402 within a multi-application viewing area 206 in accordance with an example implementation. In addition, the figure depicts an upper gesture detection area 208 to control the first application window 202 and second application window 204 in various scenarios, and further depicts a lower gesture detection area 210 to control the third application window 302 and the fourth application window 402 in various scenarios.

As described above, upon initialization on multi-application viewing mode, the user may have the option to select the multi-application layout (e.g., 2×1, 2×2, etc.). FIG. 5 depicts the 2×2 layout. The computing device 100 operates generally the same as discussed above while in the 2×2 layout except that the upper gesture detection area 208 may be utilized to control the first application window 202 and the second application window 204, while the lower gesture detection area 210 may be utilized to control the third application window 302 and the fourth application window 402. For example, a detected double tap gesture in the upper gesture detection area 208 and above the first application window 202 may cause the first application window 202 to maximize. By contrast, a double tap gesture in the lower gesture detection area 210 below the third application window 302 may cause the third application window 302 to enlarge.

Figure 6:
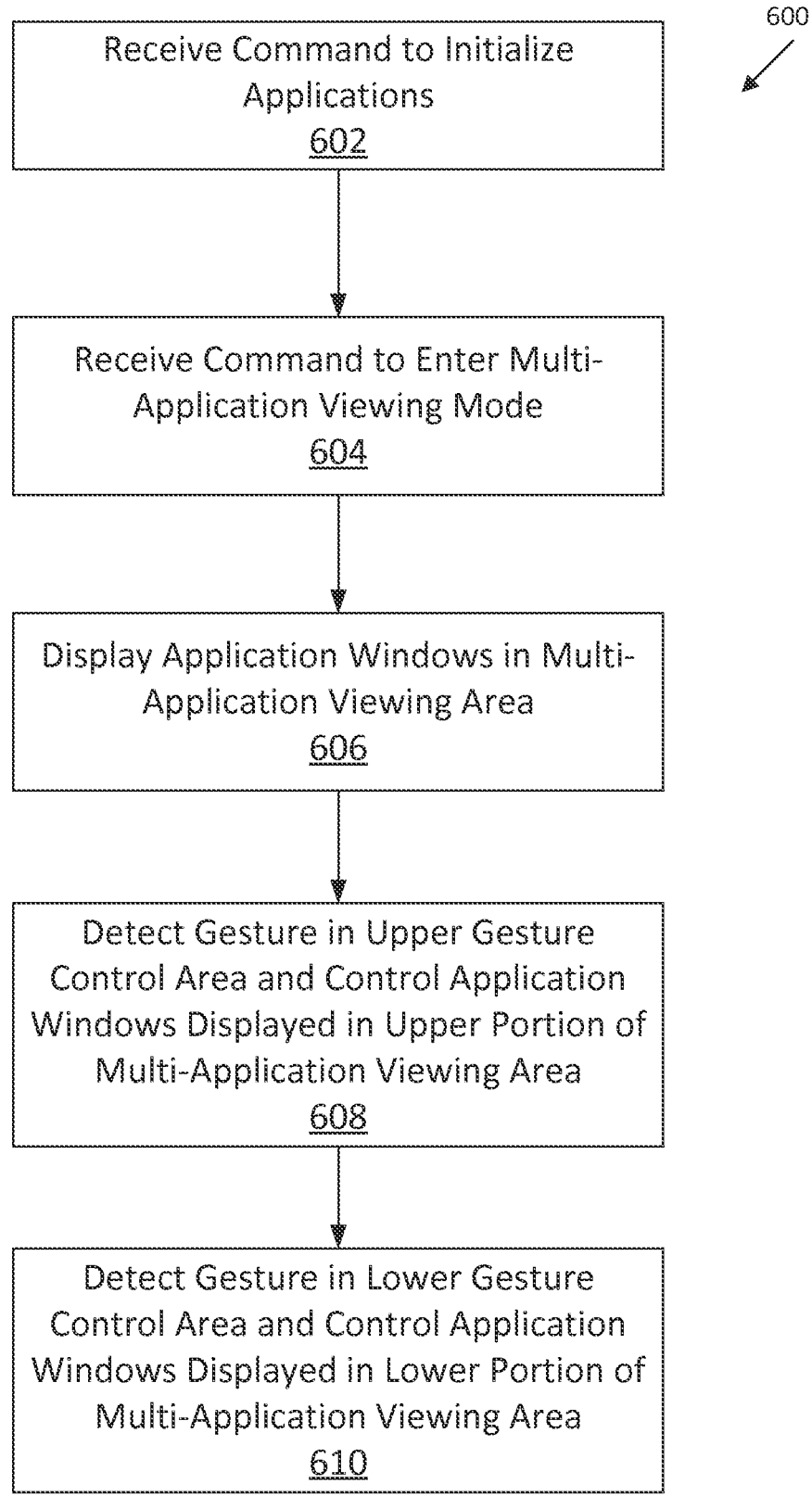
FIG. 6 depicts a process flow diagram for operating a computing device in accordance with the multi-application layout depicted in FIG. 5 in accordance with an example implementation of the present disclosure.

Turning now to FIG. 6, this figure depicts a process flow diagram 600 for operating the computing device in accordance with the multi-application layout depicted in FIG. 5 in accordance with an example implementation of the present disclosure. It should be should be readily apparent that the processes depicted in FIG. 6 represent generalized illustrations, and that other processes may be added or existing processes may be removed, modified, or rearranged without departing from the scope and spirit of the present disclosure. In addition, it should be understood that the processes depicted in FIG. 6 may represent instructions stored on a machine-readable storage medium that, when executed, may cause a computing device to respond, to perform actions, to change states, and/or to make decisions. Furthermore, the flow charts are not intended to limit the implementation of the present disclosure, but rather the flow charts illustrate functional information that one skilled in the art could use to generate software to cause a computing device to perform the illustrated operations.

The process 600 may begin at box 602, where the computing device 100 receives a command to initialize at least one application. For example, the computing device 100 may receive a command to initiate a first application (e.g., the Yahoo® Finance App), a second application (e.g., the Amazon® App), a third application (e.g., the ESPN® App), and a forth application (e.g., the YouTube® app). At block 604, the computing device 100 may receive a command to enter a multi-application viewing mode. As mentioned above, this multi-application viewing mode may provide for different viewing configurations including, but not limited to, 2×1 viewing and 2×2 viewing. In response to the user selecting 2×2 viewing, the computing device 100, at block 606, displays a first application window 202 which displays the first application (e.g., the Yahoo® Finance App) in an upper left portion of the multi-application viewing area 206, displays a second application window 204 which displays the second application (e.g., the Amazon® App) in an upper right portion of the multi-application viewing area 206, displays a third application window 302 which displays the third application the ESPN® App in a lower left portion of the multi-application viewing area 206, and displays a fourth application window 402 which displays the fourth application (e.g., the YouTube® app) in a lower right portion of the multi-application viewing area 206. Once the application windows are displayed in the multi-application viewing area 206, at block 608, in response to detecting a gesture in the upper gesture control area 208, the computing device 100 is to control an application window displayed in the upper portion of the multi-application viewing area 206 (i.e., the first application window 202 or the second application window 204). At block 610, in response to detecting a gesture in the lower gesture control area 210, the computing device 100 is to control an application window displayed in the lower portion of the multi-application viewing area 206 (i.e., the third application window 302 or the fourth application window 402).

Figure 7A:
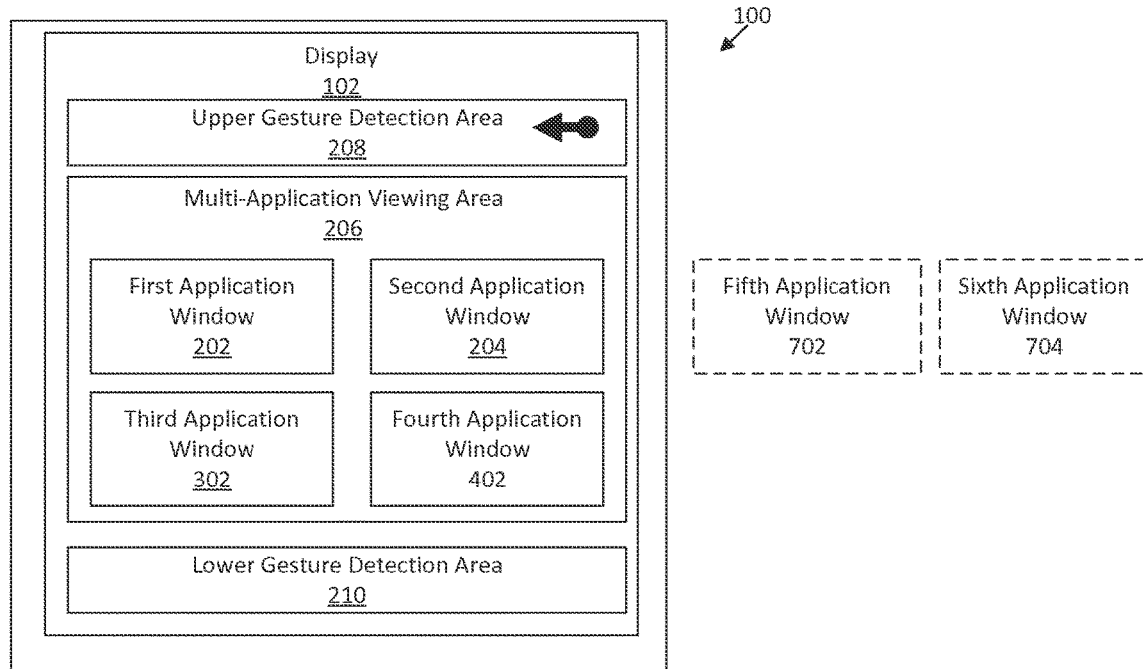
FIGS. 7(a) and 7(b) depict an example computing device with a display presenting a first application window, a second application window, a third application window, and a fourth application window within a multi-application viewing area and enabling scrolling to view a fifth application window and sixth application window in accordance with an example implementation of the present disclosure.
Figure 7B:
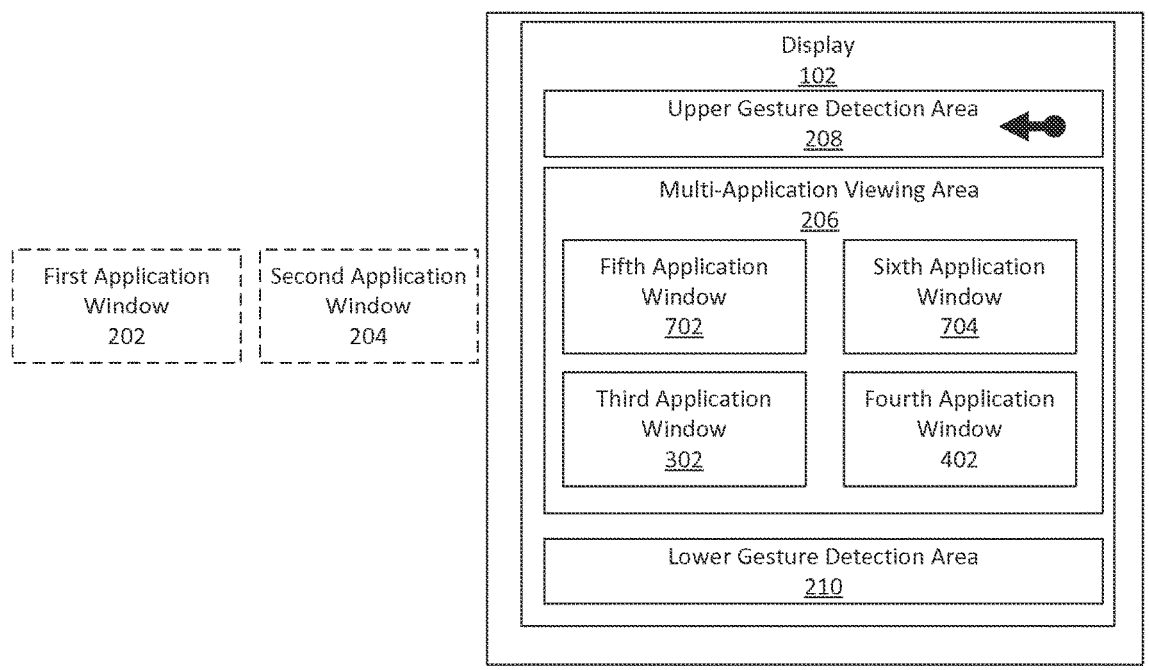

Looking now at FIGS. 7(a) and 7(b), these figures depict an example computing device 100 with a display 102 presenting a first application window 202, a second application window 204, a third application window 302, and a fourth application window 402 within a multi-application viewing area 206 and enabling scrolling to view a fifth application window 702 and sixth application window 704 in accordance with an example implementation. More particularly, aspects of the present disclosure enable a user to initialize more than four applications (six applications in the FIG. 7 example), and scroll through the applications via gesture commands. For instance, the user may open six applications and while respectively viewing four applications in a 2×2 matrix, as shown in FIG. 7(a), the user may decide that she would like to view the other two applications. In this case, the user may conduct at least one left swipe gesture in the upper gesture detection area 208. In response to detecting this gesture, the computing device 100 may scroll the application windows in the upper portion of the multi-application viewing area 206 to the left such that the fifth application window 204, sixth application window 704, third application window 302, and fourth application window 402 are viewable within the multi-application viewing area 206, and the first application window 202 and second application window 204 are no longer visible (as shown in FIG. 7(B)). In the event that the user would like to switch back to view first application window 202, second application window 204, third application window 302, and fourth application window 402, the user may conduct at least one right swipe gestures in the upper gesture detection area 208.

In another example not shown in FIG. 7, the user may conduct at least one left swipe gesture in the lower gesture detection area 210. In response to detecting this gesture, the computing device 100 may scroll the application windows in the lower portion of the multi-application viewing area 206 to the left such that the fifth application window 204, sixth application window 704, first application window 202, and second application window 204 are viewable within the multi-application viewing area 206, and the third application window 302 and fourth application window 402 are no longer visible.

Figure 8A:
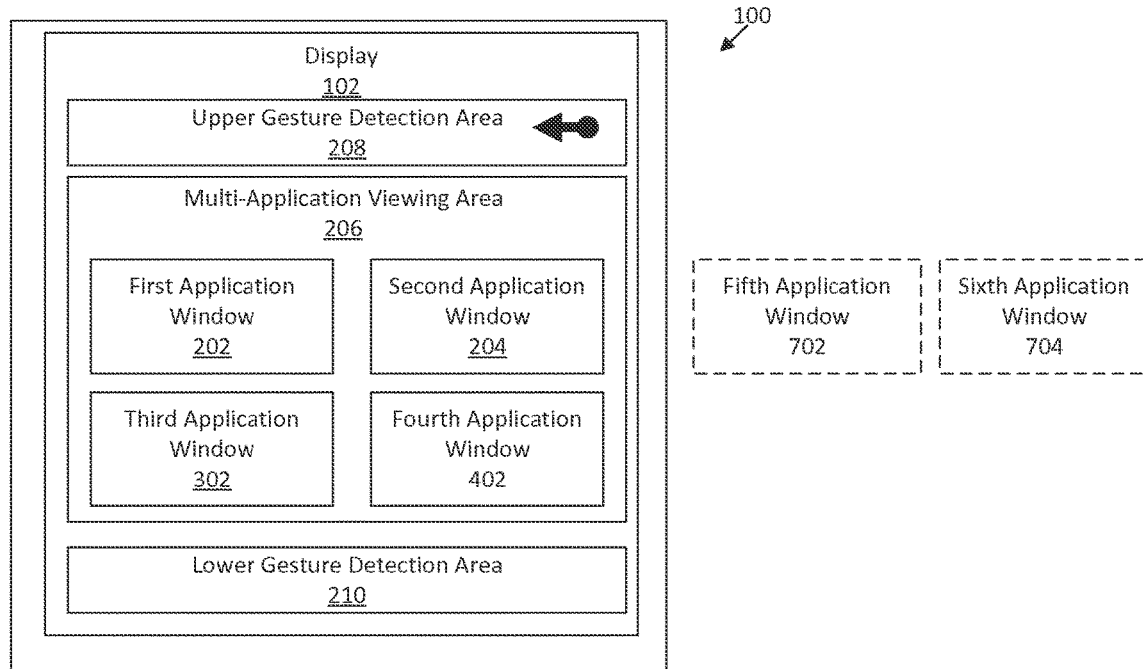
FIGS. 8(a) and 8(b) depict an example computing device with a display presenting a first application window, a second application window, a third application window, and a fourth application window within a multi-application viewing area and enabling scrolling to view a fifth application window and sixth application window in accordance with another example implementation of the present disclosure.
Figure 8B:
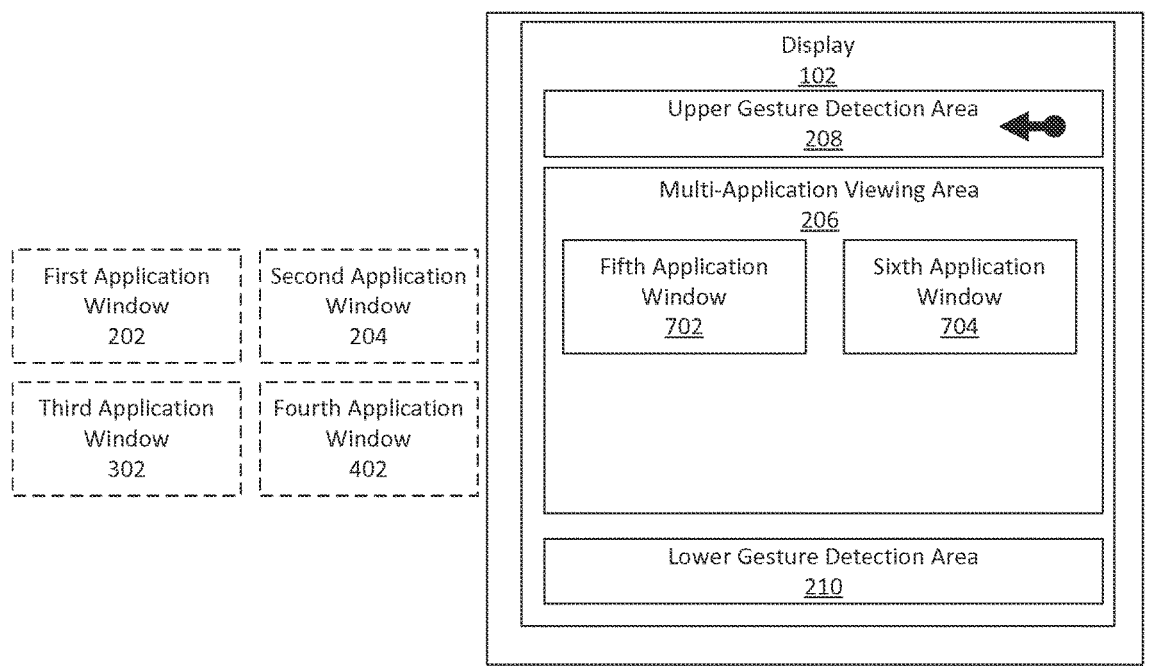

Turning now to FIG. 8, the figure depicts an example computing device 100 with a display 102 presenting a first application window 202, a second application window 204, a third application window 302, and a fourth application window 402 within a multi-application viewing area 206 and enabling scrolling to view a fifth application window 702 and sixth application window 402 in accordance with another example implementation. This implementation is similar to that shown and discussed with respect to FIGS. 7(a) and 7(b), but in this implementation, the four windows in the 2×2 matrix scroll together. Thus, a gesture left gesture in either the upper gesture detection area 208 or the lower gesture detection area 210 causes all four displayed application windows (202, 204, 302, and 402) to scroll left, and the fifth application window 702 and sixth application window 704 to appear (as shown in FIG. 8(b)).

Figure 9:
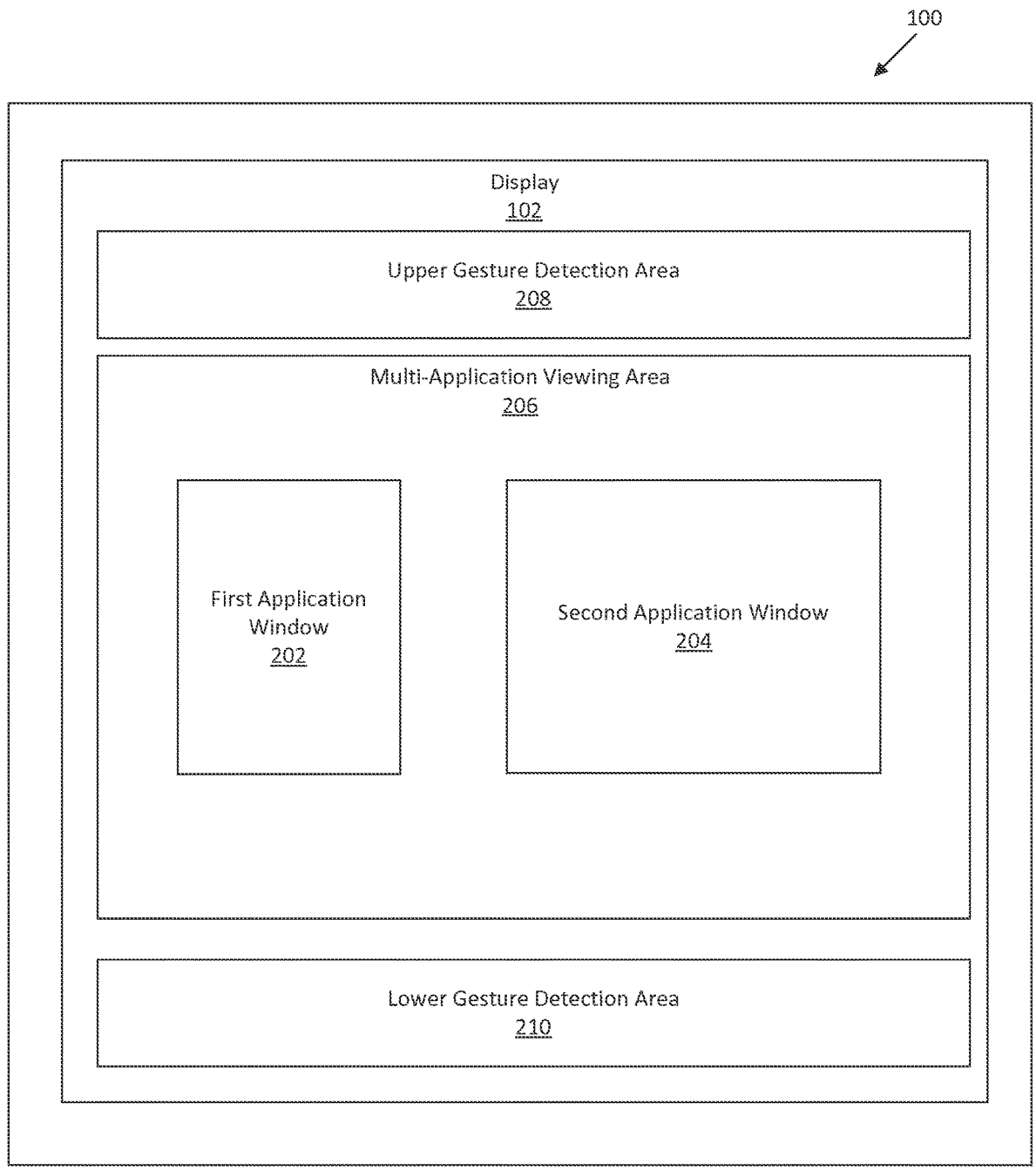
FIG. 9 depicts an example computing device with a display presenting a first application window and second application window within a multi-application viewing area within inverted aspect ratios in accordance with an example implementation of the present disclosure.

Looking now at FIG. 9, this figure depicts an example computing device 100 with a display 102 presenting a first application window 202 and second application window 204 within a mufti-application viewing area 206 with inverted aspect ratios in accordance with an example implementation of the present disclosure. More specifically, in some examples, the first application window 202 is displayed with a first aspect ratio (e.g., 3:4) and the second application window 204 is displayed with second aspect ratio which is the first aspect ratio inverted (e.g., 4:3). For example, the first application window aspect ratio may be 3:4 and the second application window ration may be 4:3. Moreover, the first application window ratio and second application window ratio may be the following pairs respectively: (i) 16:9 and 9:16, (ii) 16:10 and 10:16, (iii) 21:9 and 9:21, or (iv) 17:9 and 9:17. With this approach, the windows appear to provide one application window with a portrait orientation and the other application window with a landscape orientation.

In some examples, as shown in FIG. 9, the top portion and bottom portion of the first application window 202 are aligned with the top portion and bottom portion of the second application window 204. Hence, while the ratios are inverted as discussed above (e.g., 3:4 and 4:3), the actual width (x-axis) and height (y-axis) measurements of each application window may differ so as to keep the upper and lower portions of the applications window aligned.

The foregoing describes a novel and previously unforeseen approach to user interface operation, layout, and effectiveness. In particular, the above-described approach enables a user to intuitively view and control multiple applications at the same time and seamlessly navigate to view additional applications. Among other things, this provides an enhanced user experience for at least mobile and/or touch-focused operating systems. While the above disclosure has been shown and described with reference to the foregoing examples, it should be understood that other forms, details, and implementations may be made without departing from the spirit and scope of the disclosure that is defined in the following claims.

What is claimed is:

1. A computing device, comprising:
a display;
a processing device; and
a non-transitory machine-readable medium including instructions that when executed by the processing device cause the computing device to:
logically divide the display into a plurality of areas, including a multi-application viewing area and upper and lower gesture detection areas located respectively above and below the multi-application viewing area;
display first and second application windows of respective first and second application programs running on the computing device adjacent to each other in an upper part of the multi-application viewing area;
display third and fourth application windows of respective third and fourth application programs running on the computing device adjacent to each other in a lower part of the multi-application viewing area;
detect a first gesture in the upper gesture detection area-above one of the first and second application windows;
perform a first action corresponding to the first gesture in relation to just the one of the first and second application windows above which the first gesture was detected in the upper gesture detection area;
detect a second gesture in the lower gesture detection area below one of the third and fourth application windows; and
perform a second action corresponding to the second gesture in relation to just the one of the third and fourth application windows below which the second gesture was detected in the lower gesture detection area.

2. The computing device of claim 1, wherein the first application window, second application window, third application window, and fourth application window do not include respective title bars to control the first application window, second application window, third application window, and fourth application window.

3. The computing device of claim 1, wherein the first application window and the second application window are periodically or continuously refreshed while being displayed in the multi-application viewing area.

4. The computing device of claim 1, wherein similar gestures detected in the first gesture detection area and the second gesture detection area respectively cause the computing device operate in the same manner as to the upper part and the lower part of the multi-application viewing area.

5. The computing device of claim 1, wherein the first action comprises maximizing the one of the first and second application windows above which the first gesture was detected in the upper gesture detection area.

6. The computing device of claim 5, wherein the first gesture comprises a multiple tap gesture.

7. The computing device of claim 6, wherein the multiple tap gesture comprises a double tap gesture.

8. The computing device of claim 1, wherein the first gesture comprises a swipe down gesture, the second gesture comprises a swipe up gesture, and the first and second actions are identical.

9. The computing device of claim 8, wherein the first and second action are an application window closure action.

10. A method comprising:
logically dividing, by a computing device, a display into a plurality of areas, including a multi-application viewing area and upper and lower gesture detection areas located respectively above and below the multi-application viewing area;
displaying, by the computing device, first and second application windows of respective first and second application programs running on the computing device adjacent to each other in an upper part of the multi-application viewing area;
displaying, by the computing device, third and fourth application windows of respective third and fourth application programs running on the computing device adjacent to each other in a lower part of the multi-application viewing area;

detecting, by the computing device, a first gesture in the upper gesture detection area above one of the first and second application windows;

performing, by the computing device, a first action corresponding to the first gesture in relation to just the one of the first and second application windows above which the first gesture was detected in the upper gesture detection area;

detecting, by the computing device, a second gesture in the lower gesture detection area below one of the third and fourth application windows; and performing, by the computing device, a second action corresponding to the second gesture in relation to just the one of the third and fourth application windows below which the second gesture was detected in the lower gesture detection area.

11. The method of claim 10, wherein the first application window, second application window, third application window, and fourth application window do not include respective title bars to control the first application window, second application window, third application window, and fourth application window.

12. The method of claim 10, wherein the first application window and the second application window are periodically or continuously refreshed while being displayed in the multi-application viewing area.

13. The method of claim 10, wherein similar gestures detected in the first gesture detection area and the second gesture detection area respectively cause the computing device operate in the same manner as to the upper part and the lower part of the multi-application viewing area.

14. The method of claim 10, wherein the first action comprises maximizing the one of the first and second application windows above which the first gesture was detected in the upper gesture detection area.

15. The method of claim 14, wherein the first gesture comprises a swipe down gesture, the second gesture comprises a swipe up gesture, and the first and second actions are identical.

16. A non-transitory machine-readable medium including instructions that when executed cause a computing device to:

logically device a display into a plurality of areas, including a multi-application viewing area and upper and lower gesture detection areas located respectively above and below the multi-application viewing area;

display first and second application windows of respective first and second application programs running on the computing device adjacent to each other in an upper part of the multi-application viewing area;

display third and fourth application windows of respective third and fourth application programs running on the computing device adjacent to each other in a lower part of the multi-application viewing area;

detect a first gesture in the upper gesture detection area above one of the first and second application windows;

perform a first action corresponding to the first gesture in relation to just the one of the first and second application windows above which the first gesture was detected in the upper gesture detection area;

detect a second gesture in the lower gesture detection area below one of the third and fourth application windows; and perform a second action corresponding to the second gesture in relation to just the one of the third and fourth application windows below which the second gesture was detected in the lower gesture detection area.

17. The non-transitory machine-readable medium of claim 16, wherein the first application window, second application window, third application window, and fourth application window do not include respective title bars to control the first application window, second application window, third application window, and fourth application window.

18. The non-transitory machine-readable medium of claim 16, wherein the first application window and the second application window are periodically or continuously refreshed while being displayed in the multi-application viewing area.

19. The non-transitory machine-readable medium of claim 16, wherein similar gestures detected in the first gesture detection area and the second gesture detection area respectively cause the computing device operate in the same manner as to the upper part and the lower part of the multi-application viewing area.

20. The non-transitory machine-readable medium of claim 16, wherein the first action comprises maximizing the one of the first and second application windows above which the first gesture was detected in the upper gesture detection area.

* * * * *